United States Patent
Warren et al.

(10) Patent No.: US 7,586,850 B2
(45) Date of Patent: Sep. 8, 2009

(54) PREVENTION OF HEAD OF LINE BLOCKING IN A MULTI-RATE SWITCHED FIBRE CHANNEL LOOP ATTACHED SYSTEM

(75) Inventors: Bruce Gregory Warren, Costa Mesa, CA (US); William P. Goodwin, Costa Mesa, CA (US); Terrence R. Doherty, Costa Mesa, CA (US); Carl Joseph Mies, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 566 days.

(21) Appl. No.: 11/064,550

(22) Filed: Feb. 23, 2005

(65) Prior Publication Data

US 2006/0187837 A1    Aug. 24, 2006

(51) Int. Cl.
   H04L 12/26   (2006.01)
(52) U.S. Cl. .................................................. 370/236
(58) Field of Classification Search ........................ None
   See application file for complete search history.

(56) References Cited

U.S. PATENT DOCUMENTS

| | | | |
|---|---|---|---|
| 5,513,172 A * | 4/1996 | Shikama et al. ............. 370/428 |
| 6,532,212 B1 * | 3/2003 | Soloway et al. ............. 370/230 |
| 6,539,020 B1 * | 3/2003 | Sabey et al. ................. 370/401 |
| 6,667,985 B1 * | 12/2003 | Drummond-Murray ..... 370/415 |
| 6,748,459 B1 * | 6/2004 | Lin et al. ........................ 710/3 |
| 6,886,054 B2 * | 4/2005 | Taninaka et al. ............. 370/389 |
| 2004/0202184 A1 * | 10/2004 | Yazaki et al. ........... 370/395.31 |
| 2005/0203910 A1 * | 9/2005 | Taguchi et al. ................ 707/10 |
| 2006/0031468 A1 * | 2/2006 | Atluri et al. .................. 709/224 |

* cited by examiner

*Primary Examiner*—Edan Orgad
*Assistant Examiner*—Timothy J Weidner
(74) *Attorney, Agent, or Firm*—Morrison & Foerster LLP

(57) ABSTRACT

A method is disclosed for maintaining a table of recent accesses for each port for use in predicting whether a request for data from a source device is likely to be sent to a high speed or low speed destination device. The table of recent accesses lists every source device attached to that port and the speed of the destination device with the most recent access to each source device. When an OPN primitive is received at the source port, the source device is identified and used with the table of recent accesses to predict whether the destination device is likely to be high speed or low speed, and ultimately whether to send data from the source device or reject the request.

16 Claims, 3 Drawing Sheets

PREVENTION OF HEAD OF LINE BLOCKING IN A MULTI-RATE SWITCHED FIBRE CHANNEL LOOP ATTACHED SYSTEM

BACKGROUND OF THE INVENTION

1. Field of the Invention

The present invention relates, generally, to the communication of data in a storage system, and in particular embodiments, to preventing head of line blocking in a multi-rate switched Fibre Channel (FC) fabric loop attached system.

2. Description of Related Art

As illustrated in the exemplary interconnection diagram of a storage system 100 shown in FIG. 1, non-blocking frame-based buffered crossbar switches 102 and 152 enable a "fabric" interconnection of a large number of devices such as Host Bus Adapters (HBAs) 104 and 106, and groups of disk drives referred to as "don't care" Bunches Of Disks (xBODs) 108, 110, 112, 114 and 116. The devices are connected to ports in the switches 102 and 152. Each port contains a predetermined number of receive (Rx) buffers (e.g. five) for storing data received into the port, and a predetermined number of transmit (Tx) buffers (e.g. five) for storing data to be transmitted out of the port. In FIG. 1, port P0 of buffered switch 102 is connected to HBA 104, port P1 is connected to HBA 106, port P2 is connected to xBOD 108, port P3 is connected to xBOD 110, and N-Port P4 is connected to cascaded switch 152. Port P1 of switch 152 is connected to xBOD 116, port P2 is connected to xBOD 112, port P3 is connected to xBOD 114, and port P4 is connected to xBOD 154.

Note that unlike Fibre Channel (FC) arbitrated loop (AL) storage switches, which utilize an 8-bit Arbitrated Loop Protocol Address (AL_PA), have a 126 device limit, connect and switch loop devices that must share the bandwidth, and cannot be connected to any other storage switch, frame-based buffered switches 102 and 152 utilize a 24-bit address (which includes 8-bit domain and area fields in addition to an 8-bit AL_PA), have a much higher device limit, and connect and switch devices that do not have to share the bandwidth. Frame-based buffered switches enclosures support loop devices such as disk drives in an xBOD connected via a port, and can also be connected to other frame-based buffered switches via an inter-switch link.

Both HBAs and xBODs operate at up to a particular maximum line or signaling rate, such as 2 Gbits/sec or 4 Gbits/sec. An alternative form of measurement would be throughput. In general, a destination device (e.g. an HBA) with a lower line rate or throughput (referred to herein as a low speed destination device) that is attempting to access the same source device (e.g. an xBOD) with a higher line rate or throughput (referred to herein as a high speed source device) an as another destination device (e.g. another HBA) with a higher line rate or throughput (referred to herein as a high speed destination device) may result in the limiting or throttling of the overall throughput of the system to that of the low speed destination device. This is commonly referred to as the "multi-data rate head of line blocking" problem.

In the example of FIG. 1, suppose that HBA 104 operates at a 4 Gbits/sec, HBA 106 operates at 2 Gbits/sec, xBODs 108, 116 and 154 operate at 4 Gbits/sec, and xBODs 110, 112 and 114 operate at 2 Gbits/sec. The problem occurs when an HBA with a low speed line rate (e.g. HBA 106) and an HBA with a high speed line rate (e.g. HBA 104) both attempt to read data from the same source device having a high speed line rate. For example, in FIG. 1 the problem would occur if both HBAs 104 and 106 were both attempting to read data from xBOD 154, or alternatively xBODs 112 and 114 aggregated together, through port P4 of switch 102, which results in a 4 Gbits/sec signaling rate at port P4 (and may be referred to herein as a single source device). When data destined for HBA 106 (the low speed HBA) arrives at P4, it is first placed in receive buffers 118. When a connection through switch core 120 to P1 is made, the data is transferred to transmit buffers 122 of P1 prior to final transmission to HBA 106. However, because HBA 106 is slower than the effective signaling rate seen at port P4, the transmit buffers 122 will fill up more quickly than they can be drained. The system becomes blocked by the HBA 106 when sufficient data arrives from P4 to fill all of the transmit buffers 122 plus at least one receive buffer 118 in P4 of switch 102. At this point, although data received into P4 and destined for HBA 104 can be stored in any empty receive buffers 118, this data will be blocked by the data already stored in the receive buffers 118 and destined for HBA 106, and will remain blocked until the data for HBA 106 is drained from the receive buffers 118 at its low speed rate. Only at that time can the data destined for HBA 104 be forwarded to the transmit buffers 124 of P0. The net effect of the blocking is to reduce the throughput of both HBAs 104 and 106 closer to the speed of the slowest HBA 106.

Note that the problem does not occur when an HBA with a low speed line rate (e.g. HBA 106) and an HBA with a high speed line rate (e.g. HBA 104) both attempt to read data from the same source device having a low speed line rate. For example, in FIG. 1 the problem will not occur if both HBAs 104 and 106 were both attempting to read data from xBOD 110 (with a 2 Gbits/sec signaling rate at port P3 of switch 102). When data destined for HBA 106 (the low speed HBA) arrives at P3, it is first placed in receive buffers 134. When a connection through switch core 120 to P1 is made, the data is transferred to transmit buffers 122 of P1 prior to final transmission to HBA 106. However, because HBA 106 is the same speed as xBOD 110, the transmit buffers 122 will be drained as quickly as they can be filled up. Because the receive buffers 134 do not get backed up with data destined for P1, the system does not become blocked, and data received into P3 and destined for HBA 104 can be stored into any empty receive buffers 134 for subsequent transfer to the transmit buffers 124 of P0.

The blocking situation as described above occurs when read commands from HBAs of different speeds are issued to xBODs attached to the same source port (and must therefore share the same source port receive buffers). However, a similar blocking situation occurs when write commands from an HBA are issued to xBODs of different speeds attached to different ports on the same switch. In the example of FIG. 1, if HBA 104 (a high speed HBA) issued a write request to both xBOD 108 (a high speed xBOD) and xBOD 110 (a low speed xBOD), because xBOD 110 is a slow speed device, data being written to xBOD 110 may get backed up in the source port receive buffer 150, preventing HBA 104 from writing data to xBOD 108.

Therefore, there is a need to reduce the number of occurrences of head of line blocking so that a low speed destination device does not block the flow of data to a high speed destination device when both devices are attempting to access a high speed source device.

SUMMARY OF THE INVENTION

The present invention is directed to maintaining a table of recent accesses at each port in a frame-based buffered crossbar switch for use in predicting whether data from a source device attached to that port (the source port) is likely to be sent to a high speed or low speed destination device connected to a destination port. The table of recent accesses keeps track of the history of recent accesses to devices attached to each port on the buffered switch by listing the source AL_PA for every device attached to that port along with the speed of the destination device with the most recent access to each source device. In addition, the condition of the transmit and receive buffers in all ports is monitored.

When a current OPN primitive request from a source device attached to a source port is received at the source port, the source device is identified by extracting a source device AL_PA from the OPN primitive request. The source device AL_PA is used as an index to the table of recent accesses stored at the source port to predict whether the destination device is likely to be high speed or low speed. Because a destination device is likely to access the same source device multiple times, an assumption is made that the last destination device to successfully access the source device is also the likely destination device for the present request.

With the preceding information gathered, the action to take with respect to the request can be determined. (1) If there are no empty source port receive buffers, the request is rejected or blocked by sending a CLS primitive back to the source device, regardless of the predicted speed of the destination device. (2) If there are empty source port receive buffers and the destination device is predicted to be a high speed device, an R_RDY primitive is sent back to the source device, one frame is transmitted from the source device, and data may be transferred from the source device to the destination device as long as there are empty source port receive buffers. (3) If there are empty source port receive buffers, the destination device is predicted to be a low speed device, and there are empty destination port transmit buffers, an R_RDY primitive is sent back to the source device, one frame is transmitted from the source device, and data may be transferred from the source device to the destination device; however, the amount of data that may be transferred into the source port receive buffers can be no greater than the amount of empty destination port transmit buffers. If the destination port transmit buffers are full, the request is rejected by sending a CLS primitive back to the source device. To prevent starvation, the OPN request may be closed only a predetermined number of times before the request is allowed to go through.

The table of recent accesses may be updated every time a frame is received from a destination device. When a frame from a destination device and intended for a source device is received for the first time, the destination ID (D_ID) of the destination device is used as an index to another table of device speeds, which contains the AL_PAs of the devices connected to the storage system and provides an indication of their speeds (e.g. high speed or low speed). The table of device speeds is created during initialization of the storage system, when all devices are initialized and acknowledge their existence to their attached switch, and information about each of the devices in the storage system is shared by the processors in each switch.

The speed of the destination device (obtained from the table of device speeds) is then stored into the table of recent accesses in association with a source device AL_PA entry. If a frame from a different destination device and intended for the same source device is subsequently received, the D_ID of the destination device is again used as an index to the table of device speeds to determine the speed of the destination device. The speed of this latest destination device to successfully access the source device is updated within table of recent accesses in association with the source device AL_PA entry.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention are directed to maintaining a table of recent accesses at each port in a frame-based buffered crossbar switch for use in predicting whether a current request for data from a source device attached to that port (the source port) is likely to be sent to a high speed or low speed destination device connected to a destination port. In addition, the condition of the transmit and receive buffers in all ports is monitored. When a current request to transfer data is received at a source port communicatively coupled to a source device, the source device is identified and the table of recent accesses stored in association with the source port is used to predict whether the presumed requesting device (i.e. the presumed destination device) is likely to be high speed or low speed. If there are no empty source port receive buffers, the request is rejected or blocked, regardless of the predicted speed of the presumed destination device. If there are empty source port receive buffers and the destination device is presumed to be a high speed device, data may be transferred from the source device to the destination device as long as there are empty source port receive buffers. If there are empty source port receive buffers and the destination device is presumed to be a low speed device, data may be transferred from the source device to the destination device only if there are also empty destination port transmit buffers (i.e. if there is no impediment to subsequently transferring the data from the source port receive buffers to the destination port transmit buffers); the amount of data that may be transferred into the source port receive buffers can be no greater than the amount of empty destination port transmit buffers.

Figure 1:
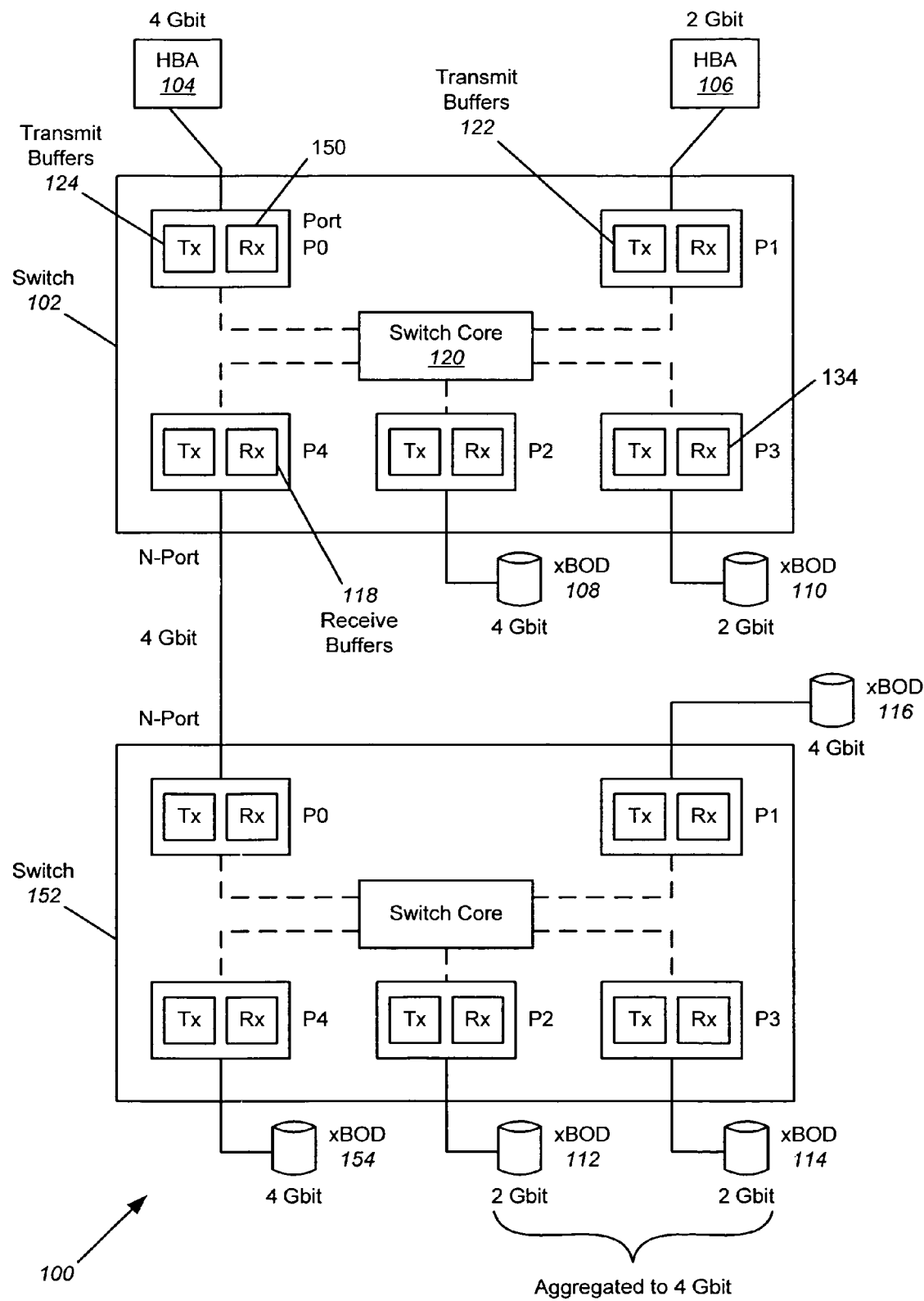
FIG. 1 is an exemplary interconnection diagram of a storage system comprised of non-blocking frame-based buffered crossbar switches and devices of various speeds to illustrate the head of line blocking problem.
Figure 2:
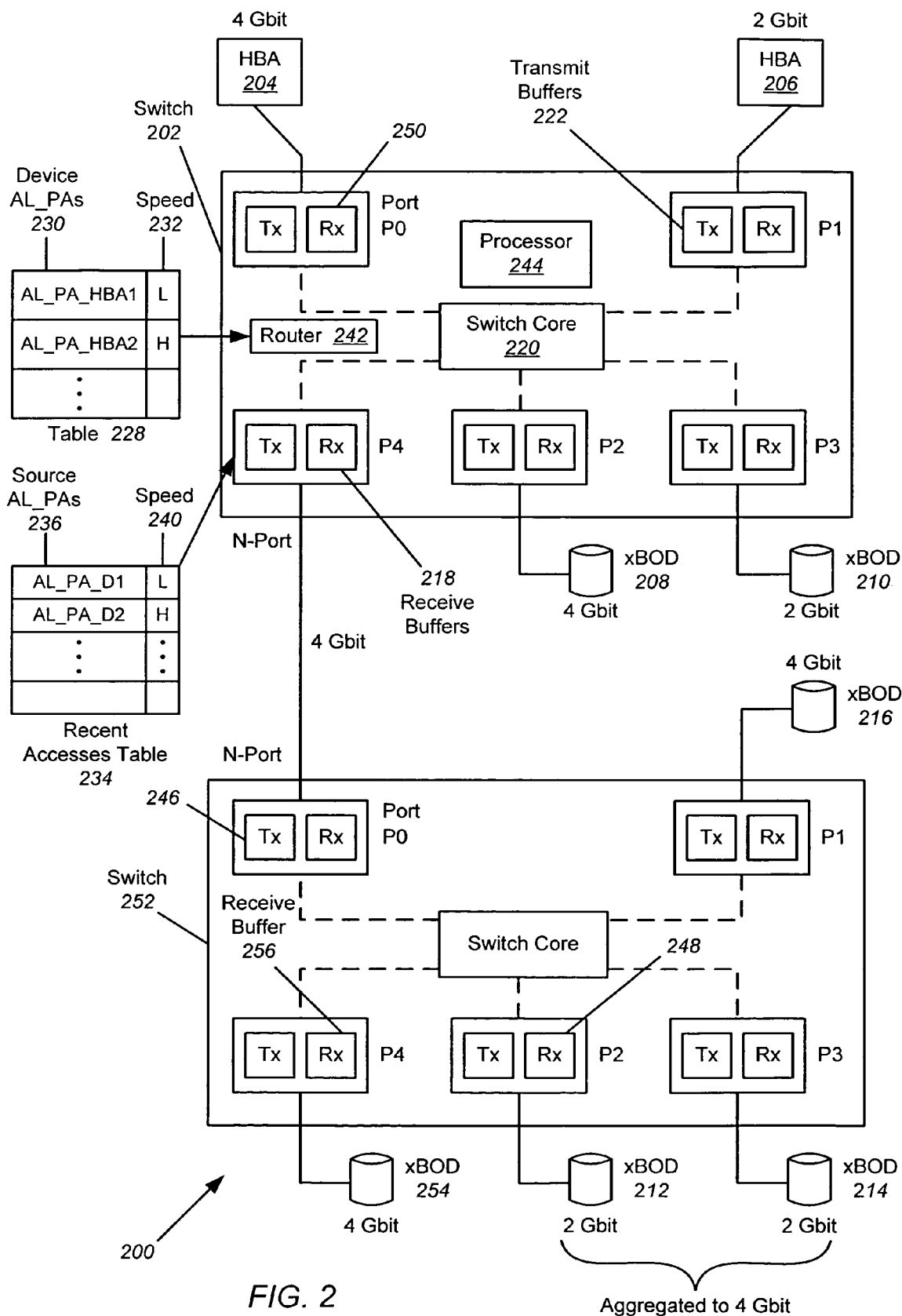
FIG. 2 is an exemplary interconnection diagram of a storage system comprised of non-blocking frame-based buffered crossbar switches utilizing tables of recent accesses to reduce the head of line blocking problem according to embodiments of the present invention.

FIG. 2 is an exemplary interconnection diagram of a storage system 200 comprised of non-blocking frame-based buffered crossbar switches 202 and 252 utilizing tables of recent accesses to reduce the head of line blocking problem according to embodiments of the present invention. In FIG. 2, port P0 of buffered switch 202 is connected to HBA 204, port P1 is connected to HBA 206, port P2 is connected to xBOD 208, port P3 is connected to xBOD 210, and N-Port P4 is connected to buffered switch 252. Port P1 of switch 252 is connected to xBOD 216, port P2 is connected to xBOD 212, port P3 is connected to xBOD 214 and port P4 is connected to xBOD 254. In the example of FIG. 2, suppose that HBA 204 operates at a 4 Gbits/sec, HBA 206 operates at 2 Gbits/sec, xBODs 208, 216 and 254 operate at 4 Gbits/sec, and xBODs 210, 212 and 214 operate at 2 Gbits/sec.

In embodiments of the present invention, a table is maintained for each port that keeps track of the history of recent accesses to devices attached to that port. In FIG. 2, only table 234 associated with P4 on switch 202 is shown, although it should be understood that similar tables are maintained for each port in each switch. Table 234 lists the source AL_PA 236 for every source device attached to port P4 along with the speed 240 of the destination device with the most recent access to each source device. Accesses, as defined herein, include reading data from the source device or writing data from the source device. Table 234 may be implemented in registers in each port, and may be maintained by state machine control logic in each switch.

In the present example, if a destination device sends an OPN primitive request to switch 202 to read data from a source device attached to switch 202 (i.e. a request to transfer data), then after the request has been processed down to the source device, and the source device has gathered the requested data, the source device sends an OPN request to the source port. The source device AL_PA is then extracted from the OPN primitive by logic in the source port. Note that in a fabric environment the destination device AL_PA in the OPN primitive is commonly zero, and thus the actual destination device cannot be determined from the OPN primitive. In public loop mode an OPN from a device to the switch takes the form OPN FL_PORT_AL_PA AL_PS, where FL_PORT_AL_PA is the special Fabric Loop Port Address of the port on the switch which all devices on that port's loop must use to access a device attached to a different part of the switch or fabric. AL_PS is the lower 8 bits of the full 24 bit address of the device trying to send data to the fabric. In public loop mode, AL_PS must be used because the ultimate destination of data is not known until a frame is received, which by that time it is clearly too late to reject it.

The source device AL_PA is used to index table 234 and determine the speed of the last destination device to successfully access that source device. Because a destination device is likely to access the same source device multiple times, embodiments of the present invention make an assumption that the last destination device to successfully access the source device is also the likely or presumed destination device for the present request. In addition, the number of empty destination port transmit buffers, if any, and the number of empty source port receive buffers, if any, are determined from state machine control logic in each of the ports. This control logic may include counters, pointers to circular buffers, and the like.

With the preceding information gathered, the action to take with respect to the request can be determined. (1) If there are no empty source port receive buffers, the request is rejected or blocked by sending a CLS primitive back to the source device, regardless of the predicted speed of the destination device. (2) If there are empty source port receive buffers and the destination device is predicted to be a high speed device, an R_RDY primitive is sent back to the source device, one frame is transmitted from the source device, and data may be transferred from the source device to the destination device as long as there are empty source port receive buffers. (3) If there are empty source port receive buffers, the destination device is predicted to be a low speed device, and there are empty destination port transmit buffers (i.e. if there is no impediment to subsequently transferring the data from the source port receive buffers to the destination port transmit buffers), an R_RDY primitive is sent back to the source device, one frame is transmitted from the source device, and data may be transferred from the source device to the destination device; however, the amount of data that may be transferred into the source port receive buffers can be no greater than the amount of empty destination port transmit buffers. If the destination port transmit buffers are full, the request is rejected by sending a CLS primitive back to the source device. To prevent starvation, the OPN request may be closed only a predetermined number of times before the request is allowed to go through. State machine control logic within each port is responsive to the OPN, R_RDY and CLS primitives, and implement the decisions described above utilizing table 234.

It should be understood that in private loop mode (i.e. no fabric) the destination AL_PA can be obtained directly from the OPN and prediction is not necessary. The complete destination address may be obtained from the OPN, which takes the form OPN AL_PD AL_PS. In private loop mode the upper 16 bits of the 24 bit device address are all zeros, and the 8 bit AL_PA is duplicated in the OPN and in the D_ID and S_ID of the FC frame. Therefore, in private loop mode it is possible to look up the speed of the final destination directly from a table containing the speed of every destination, and it is not necessary to use prediction based on recent history. Devices determine if they are attached to a public (fabric) or private loop by sending and receiving responses from the network they are attached to.

A particular example will now be presented. In this example, assume that HBA 206 (with an AL_PA of AL_PA_HBA1) sends an OPN primitive request to switch 202 to read data from a drive in xBOD 254 communicatively coupled to P4 through switch 252. After the request has been processed down through switch 202 and switch 252 to xBOD 254 and the drive has gathered the requested data, an OPN request is transmitted back to P4 in switch 252. The OPN is received by the state machine in the port logic of P4 in switch 252, and the AL_PA for that drive (e.g. AL_PA_D1) is extracted from the OPN primitive. AL_PA_D1 is used as an index to the table of recent accesses 234 stored in association with P4 to determine the speed of the last destination device to successfully access that drive. In the example of FIG. 2, table 234 indicates that the last destination device to successfully access that drive was a low speed device. (Note that in private loop mode, AL_PA_D1 would be used to index table 228 to determine the destination port speed.) Under these circumstances, if the source port P4 receive buffers 256 are full, the request is rejected or blocked by sending a CLS primitive back to xBOD 254. If the source port receive buffers 256 are not full and there are empty destination port transmit buffers 246, an R_RDY primitive is sent back to xBOD 254, and data may be transferred from xBOD 254 to HBA 206; however, the amount of data that may be transferred into the source port receive buffers 218 can be no greater than the amount of empty destination port transmit buffers 246.

Table 234 may be updated every time a frame is received from a destination device. Frames contain the full 24-bit address of both the source device and the destination device. When a frame from a destination device and intended for a source device is received for the first time, the destination ID (D_ID) of the destination device is used as an index to table 228, which contains the AL_PAs 230 of the devices connected to the storage system and provides an indication of their speeds 232 (e.g. high speed, that is by receiving a frame at the high speed source device, or low speed). Note that if the destination device is attached to a cascaded switch, in some circumstances the source and destination address contained in the frame may occasionally not be the actual address of the source and destination devices. In these rare circumstances, information must be passed between the routers of the cascaded switches in order to determine the actual address of the destination device, and determine the speed of the destination device from the table 228 in the cascaded switch.

The speed of the destination device 240 (obtained from table 228) is then stored into table 234 in association with a source device AL_PA entry 236. If a frame from a different destination device and intended for the same source device is subsequently received, the D_ID of the destination device is again used as an index to table 228 to determine the speeds of the destination device. The speed of the latest destination device to successfully access the source device is updated within table 234 in association with the source device AL_PA entry 236. In this way, table 234 always contains the speed of the last destination device to successfully access the source devices listed in the table.

Note that table 228, described above, is maintained in each switch and may be loaded by software and stored in a router 242 within the switch. Table 228 is created during initialization of the storage system, when all devices acknowledge their existence to their attached switch, and information about each of the devices in the storage system is shared by the processors 244 in each switch.

The example described above involved a first situation where one high speed destination device (HBA 204) and one low speed destination device (HBA 206) are requesting read data from a high speed source device (a device in xBOD 254), creating a possible blocking condition within the source port receive buffers (receive buffers 218). However, it should be understood that embodiments of the present invention are also applicable to a second situation where one high speed source device (e.g. HBA 204) is requesting the writing of data to one high speed destination device (e.g. xBOD 208) and one low speed destination device (e.g. xBOD 210) (another form of a request to transfer data), creating a possible blocking condition within the source port receive buffers (e.g. receive buffers 250). The embodiments of the present invention described above are equally applicable to this second situation, and will not be repeated here.

The embodiments of the present invention described above may be employed in a system where there is only a single fabric buffered switch. However, if multiple buffered switches are cascaded via an N_PORT, as in the example of FIG. 2, then it is more difficult to determine if the system will be blocked by a low speed device. It is possible that frames destined for a low speed device will block other frames when an intermediate buffered switch (e.g. buffered switch 202) is located between the HBA (e.g. HBA 206) and the buffered switch attached to the disks (e.g. buffered switch 252). Suppose that in the example of FIG. 2, the receive buffers 218 in the cascade port P4 of switch 202 are full. However, if there are empty destination port transmit buffers 246 (from the perspective of switch 252) in the cascade from buffered switch 252 to buffered switch 202, and there are empty source port receive buffers 248, the request would not be rejected, and data destined for low speed HBA 206 from buffered switch 252 would be transmitted. Once this data occupies the destination port transmit buffers 246, they will block all other traffic that uses port P0 on switch 252 as a destination port.

To prevent this blocking from occurring, communications across the N-Port cascade can provide the source port in switch 252 the status of the receive buffers 218 in P4 of switch 202. An N_Port is a point to point connection (i.e. only two devices may be attached). Because it is point to point, OPN primitives are not required to indicate which devices are communicating. The two devices are always connected and may send R_RDYs any time a buffer becomes available. Each port maintains a count of credit it has extended to a connected device and credit it has received from a connected device. Each time an R_RDY is received it increments its "credit in" count and each time an R_RDY is sent it increments its "credit out" count. When a frame is sent, the "credit in" count is decremented, and when a frame is received, the "credit out" count is decremented. This invention provides additional restrictions on when those R_RDYs may be sent.

With this information and the status of the transmit buffers 246 in P0 of switch 252 and the status of the receive buffers 248 in P2 of switch 252, a decision can be made by the source device attached to source port P2 in switch 252 whether or not to send a CLS or an R_RDY. There must be empty source port receive buffers 248 and empty destination port transmit buffers 246 (from the perspective of switch 252), as well as empty source port receive buffers 218. Note that on an N_Port, an OPN is not received to indicate the source or possible destination (e.g. P1 or P0 in this example), so receive and transmit buffers in the connection path can only be checked up to the receive buffers 218 of P4. (Note that in private loop mode, the connection between P4 of switch 202 and P0 of switch 252 are L_Ports, and an OPN is required, so it is possible to look further up the chain. After all possible transmit and receive buffers are checked and it is determined that the request can be accepted, an R_RDY can be sent from the source device attached to source port P2 in switch 252. Of all these buffers, the buffer with the smallest number of empty buffers is the limiting factor. Only as much data can be transmitted from the source device as there are empty buffers in the transmit or receive buffer with the smallest number of empty buffers.

The problem of cascaded switches can be ameliorated by checking whether the destination port has received any R_RDY primitives. If the cascade hasn't received any R_RDYs then the attached switch's receive buffers are full and the low speed frames should be rejected. If a port has receive buffers available, it can send an R_RDY, and if a port's "credit in" count is greater than zero it can send a frame for every credit it has received. For example, if P0 of 252 does not have any credit then no frames destined for a slow device would be transferred to the transmit buffers 246 of P0.

Figure 3:
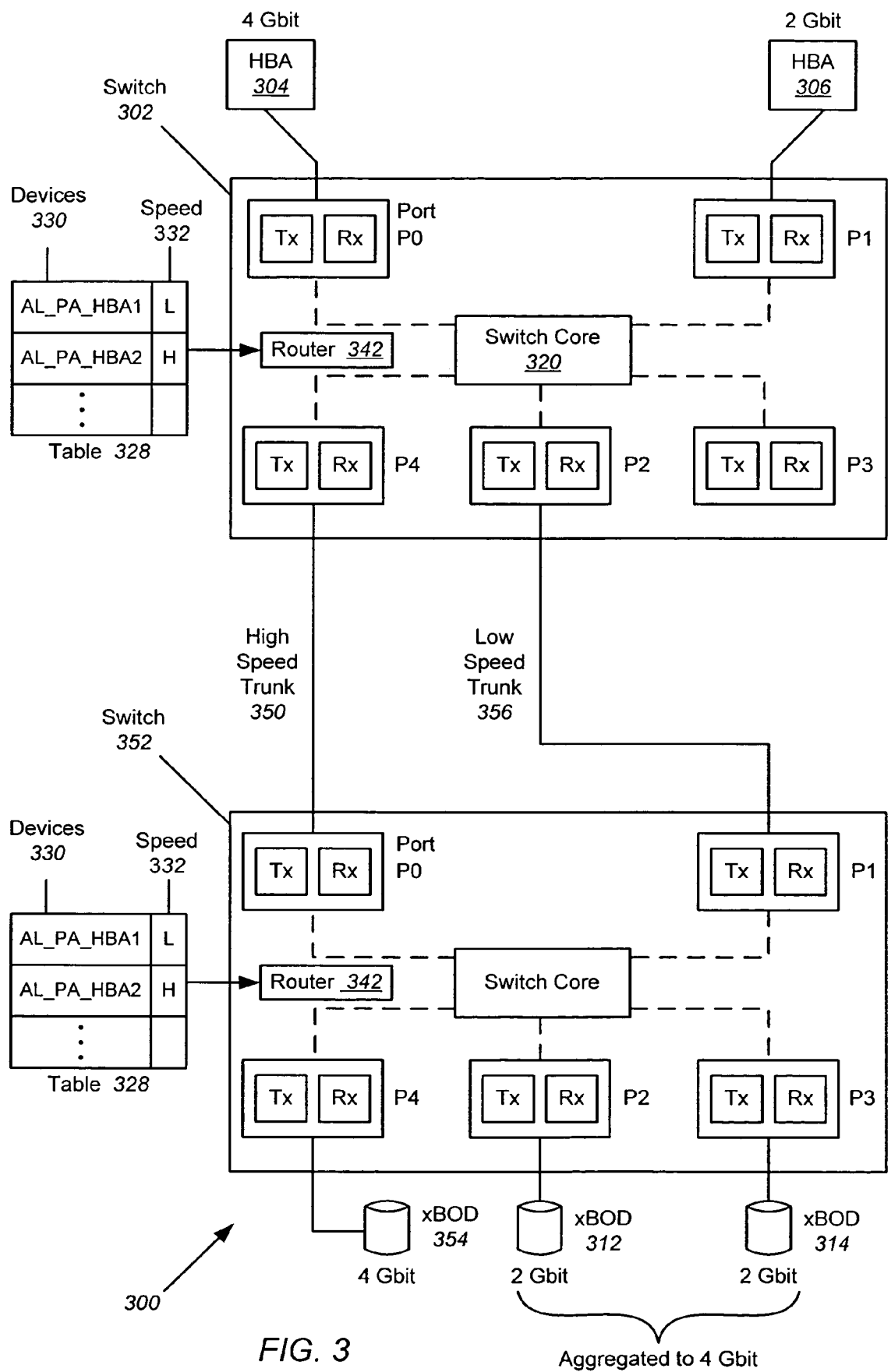
FIG. 3 is an exemplary interconnection diagram of a storage system comprised of non-blocking frame-based buffered crossbar switches utilizing trunking to create multiple connections between switches and eliminate the head of line blocking problem when the source device is attached to a cascaded switch according to alternative embodiments of the present invention.

FIG. 3 is an exemplary interconnection diagram of a storage system 300 comprised of non-blocking frame-based buffered crossbar switches 302 and 352 utilizing trunking to create multiple connections between switches and eliminate the head of line blocking problem when the source device is attached to a cascaded switch according to alternative embodiments of the present invention. In FIG. 3, port P0 of buffered switch 302 is connected to HBA 304, port P1 is connected to HBA 306, port P2 is connected to port P1 of switch 352, and port P4 is connected to port P0 of switch 352. Port P2 of switch 352 is connected to xBOD 312, port P3 is connected to xBOD 314, and port P4 is connected to xBOD 354. In the example of FIG. 3, suppose that HBA 304 operates at a 4 Gbits/sec, HBA 306 operates at 2 Gbits/sec, xBOD 354 operates at 4 Gbits/sec, and xBODs 312 and 314 operate at 2 Gbits/sec.

In the present example, if a destination device (e.g. one of the HBAs) sends an OPN primitive request that is routed to port P4 on switch 302 to read data from a source device communicatively coupled to port P4 (e.g. xBOD 354 attached to cascaded switch 352), instead of determining the source device and predicting a likely destination device, port P4 sends an R_RDY primitive back to the destination device to open the connection. Note that because all requests will be separately routed over either the high speed or low speed trunk, and there is no impediment to the flow of data though either trunk, an R_RDY can be sent back immediately. There is no need to reject requests based on the likely speed of the destination device and the state of the source port receive buffers and the destination port transmit buffers, and thus no table of recent accesses is needed. When a frame is received from the destination device, the actual source and destination AL_PAs are extracted, and the speed of the destination device is determined from table 328. In other words, in this embodiment, the "presumed" destination device is the actual destination device. Based on the speed of the destination device, data is routed to either the high speed trunk 350 or the low speed trunk 356. By utilizing trunking and two ports, no head of line blocking will occur.

In public loop mode with cascaded switches, ports between switches are specially identified by users when the system is installed. These inter-switch links are referred to as cascades. In addition, multiple ports may be cascaded between two switches. These additional ports are referred to as duplicate cascades. With this information provided by the user, software in the switches can communicate the information about the devices attached to each switch. Fibre Channel specifies a protocol for transferring this information. Note that in embodiments of the present invention, vendor specific information also needs to be transferred to indicate the speed of the devices.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for reducing head of line blocking in a first multi-port frame-based buffered storage switch having transmit buffers and receive buffers associated with each port when a high speed destination device attached to a first destination port and a low speed destination device attached to a second destination port both need to receive data from a high speed source device communicatively coupled to one or more source ports, the method comprising:
    maintaining a table of recent accesses at said ports;
    receiving a request to transfer data at the one or more source ports;
    determining a speed of a presumed destination device by reference to said table;
    if the presumed destination device is a low speed destination device, transferring data to the receive buffers of a source port only after determining that the data can be subsequently transferred to the transmit buffers of the second destination port attached to the low speed destination device without impediment; and
    if the presumed destination device is a high speed destination device, transferring data to the receive buffers of a source port only as long as the receive buffers have space to store the data.

2. The method as recited in claim 1, the method further comprising:
    determining the speed of the presumed destination device by
        receiving an OPN primitive containing the request,
        extracting a source device AL_PA from the OPN primitive, and
        using the source device AL_PA to index said table of recent accesses and determine the speed of the presumed destination device;
    if the data is destined for the low speed destination device, transferring data to the receive buffers of the source port only as long as the receive buffers have space to store the data and the transmit buffers of the second destination port attached to the low speed destination device have space to store the data from the receive buffers; and
    if the data is destined for the high speed destination device, transferring data to the receive buffers of the source port as long as the receive buffers have space to store the data.

3. The method as recited in claim 2, further comprising maintaining a separate table of recent accesses for each port in the multi-port frame-based buffered storage switch.

4. The method as recited in claim 3, wherein each table of recent accesses contains a source AL_PA for every device attached to the port associated with that table of recent accesses, the speed of the destination device with the most recent access to the device represented by the source AL_PA.

5. The method as recited in claim 4, further comprising:
    updating the table of recent accesses associated with a particular port each time a frame is received.

6. The method as recited in claim 2, further comprising:
    if the data is destined for the low speed destination device but the receive buffers do not have space to store the data or the transmit buffers do not have space to store the data from the receive buffers, rejecting the request; and
    if the data is destined for the high speed destination device but the receive buffers do not have space to store the data, rejecting the request.

7. The method as recited in claim 6, further comprising:
    if the request has been rejected a predetermined consecutive number of times without any transfer of data to the low speed device, transferring data to the receive buffers of one of the one or more source ports only as long as the receive buffers have space to store the data.

8. The method as recited in claim 1, operable when the high speed source device is attached to a second cascaded multi-port frame-based buffered storage switch having transmit buffers and receive buffers associated with each port and communicatively coupled to two source ports on the first buffered storage switch via a high speed trunk and a low speed trunk, the method further comprising:
    determining the speed of the presumed destination device by
        receiving a frame at the high speed source device,
        extracting an actual destination device AL_PA from the frame, and
        using the actual destination device AL_PA to index said table of devices and determine a speed of the actual destination device;
    if the data is destined for the low speed destination device, transferring data through the second buffered storage switch and the low speed trunk to the receive buffers of the source port connected to the low speed trunk as long as the receive buffers have space to store the data; and
    if the data is destined for the high speed destination device, transferring data through the second buffered storage switch and the high speed trunk to the receive buffers of the source port connected to the high speed trunk as long as the receive buffers have space to store the data.

9. A first multi-port frame-based buffered storage switch for reducing head of line blocking, comprising:
one or more first ports couplable to a high speed source device for sending data;
a second port couplable to a high speed destination device for receiving data from the high speed source device;
a third port couplable to a low speed destination device for receiving data from the high speed source device;
a table of recent accesses associated with each of the one or more first ports and containing a list of all devices connected to the respective port and, for each device in the list, a speed of the destination device having a most recent access to that device; and
a state machine associated with each of the one or more first ports for
receiving a request to transfer data,
determining a speed of a presumed destination device by reference to the associated table of recent accesses,
if the presumed destination device is a low speed destination device, transferring data to receive buffers in one of the one or more first ports only after determining that the data can be subsequently transferred to transmit buffers in the third port without impediment, and
if the presumed destination device is a high speed destination device, transferring data to receive buffers in the second port only as long as the receive buffers have space to store the data.

10. The first storage switch as recited in claim 9, further comprising:
wherein the state machine associated with the first port is further configured for
determining a presumed destination device for the received request and a speed of the presumed destination device by
receiving an OPN primitive containing the request,
extracting a source device AL_PA from the OPN primitive, and
using the source device AL_PA to index the associated table of recent accesses and determine a presumed destination device AL_PA for the request and the speed of the presumed destination device,
if the data is destined for the low speed destination device, transferring data to the receive buffers of the first port only as long as the receive buffers have space to store the data and the transmit buffers of the third port have space to store the data from the receive buffers, and
if the data is destined for the high speed destination device, transferring data to the receive buffers of the first port as long as the receive buffers have space to store the data.

11. The first storage switch as recited in claim 10, wherein each table of recent accesses contains a source AL_PA for every device attached to the port associated with that table of recent accesses and a speed of the destination device with the most recent access to the device represented by the source AL_PA.

12. The first storage switch as recited in claim 10, the state machine associated with each of the one or more first ports further configured for:
if the data is destined for the low speed destination device but the receive buffers do not have space to store the data or the transmit buffers do not have space to store the data from the receive buffers, rejecting the request; and
if the data is destined for the high speed destination device but the receive buffers do not have space to store the data, rejecting the request.

13. The first storage switch as recited in claim 10, the state machine associated with each of the one or more first ports further configured for:
if the request has been rejected a predetermined consecutive number of times without any transfer of data to the low speed device, transferring data to the receive buffers of the first port only as long as the receive buffers have space to store the data.

14. The first storage switch as recited in claim 10, the state machine associated with each of the one or more first ports further configured for:
updating the table of recent accesses associated with a particular port each time a frame is received.

15. A storage system comprising the first storage switch as recited in claim 9, further comprising:
a second cascaded multi-port frame-based buffered storage switch having transmit buffers and receive buffers associated with each port, the second storage switch attached to the high speed source device and communicatively coupled to two first ports on the first storage switch via a high speed trunk and a low speed trunk;
a table of devices stored in the first and second storage switches containing a list of all devices connected to the storage system and, for each device in the list, the speed of that device; and
the state machine associated with each of the two first ports further configured for
determining a presumed destination device for the received request and a speed of the presumed destination device by
receiving a frame at the high speed source device,
extracting an actual destination device AL_PA from the frame, and
using the actual destination device AL_PA to index the table of devices and determine a speed of the actual destination device,
if the data is destined for the low speed destination device, transferring data through the second buffered storage switch and the low speed trunk to the receive buffers of the first port connected to the low speed trunk as long as the receive buffers have space to store the data, and
if the data is destined for the high speed destination device, transferring data through the second buffered storage switch and the high speed trunk to the receive buffers of the first port connected to the high speed trunk as long as the receive buffers have space to store the data.

16. A storage area network (SAN) comprising the storage system of claim 15.

* * * * *